United States Patent Office 3,247,226
Patented Apr. 19, 1966

3,247,226
4-DIMETHYLAMINO AND 4-HYDROXY-
TETRACYCLOXIDES
Robert Carlyle Esse, Pearl River, N.Y., and George
Madison Sieger, Montvale, N.J., assignors to American
Cyanamid Company, Stamford, Conn., a corporation
of Maine
No Drawing. Filed July 6, 1964, Ser. No. 380,605
11 Claims. (Cl. 260—345.3)

This is a continuation-in-part of application Serial No. 305,818, filed August 30, 1963, which is a continuation-in-part of application Serial No. 233,949, filed October 29, 1962, both now abandoned.

This invention relates to new organic compounds and, more particularly, is concerned with novel 4-hydroxytetracycloxides and 4-dimethylaminotetracycloxides and with methods of preparing these novel compounds. The novel 4-hydroxytetracycloxides and 4-dimethylaminotetracycloxides of the present invention may be represented by the following general formula:

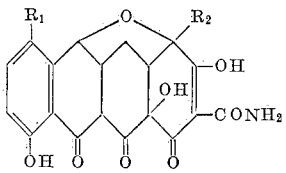

wherein $R_1$ is hydrogen or halogen and $R_2$ is hydroxy or dimethylamino. Halogen is exemplified by chlorine, bromine and iodine.

The nomenclature of the novel compounds of the present invention is based upon the hypothetical compound "tetracycloxide" which would have the following formula:

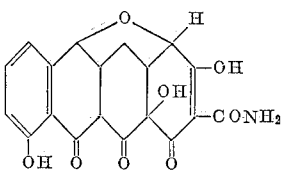

The numbering system of "tetracycloxide" is the same as for the tetracyclines and the hetero oxygen atom is not numbered. The full chemical name of "tetracycloxide" according to Chemical Abstracts' nomenclature is 1,4,4a,5,5a,6,11,11a,12,12a - decahydro-4β,6β - epoxy-3,10,12aα - trihydroxy-1,11,12-trioxo-2 - naphthacenecarboxamide. When $R_1$ is hydrogen and $R_2$ is hydroxy in the general formula set forth above, then the compound represented is 4-hydroxytetracycloxide whose full chemical name according to Chemical Abstracts' nomenclature is 1,4,4a,5,5a,6,11,11a,12,12a - decahydro-4β,6β-epoxy-3,4α,10,12aα-tetrahydroxy-1,11,12-trioxo-2 - naphthacenecarboxamide. A trivial name for 4-hydroxytetracycloxide is 4-dedimethylamino-4-oxo-6 - demethyltetracycline-4,6-hemiketal and this nomenclature was employed in our copending application Serial No. 233,949, filed October 29, 1962. Where $R_1$ is hydrogen and $R_2$ is dimethylamino in the general formula set forth above, then the compound represented is 4-dimethylaminotetracycloxide whose full chemical name according to Chemical Abstracts' nomenclature is 1,4,4a,5,5a,6,11,11a,12,12a - decahydro-4α-dimethylamino-4β-6β-epoxy-3,10,12aα - trihydroxy-1,11,12-trioxo-2-naphthacenecarboxamide.

The novel compounds of the present invention are well defined crystalline materials having characteristic ultraviolet absorption spectra indicating the presence of a blocked BCD chromophore. The 4-hydroxytetracycloxides may be conveniently recrystallized from a methyl Cellosolve 0.1 N hydrochloric acid mixture and are fairly stable in acid methanol. The 4-dimethylaminotetracycloxides, although extremely insoluble in water, may be hydrolyzed to the corresponding 4-hydroxytetracycloxides. The conditions for the hydrolysis cannot be rigidly defined but, in general, the hydrolysis is more rapid the more acidic the aqueous medium. Hydrolysis is also favored in acidic water-solvent systems where the diluting solvent (e.g., dimethylformamide, dimethylsulfoxide, methyl Cellosolve) increases the solubility of the 4 - dimethylaminotetracycloxides. Both the 4-hydroxytetracycloxides and the 4-dimethylaminotetracycloxides degrade rapidly in alkaline pH values.

The novel compounds of the present invention may be readily prepared in good yield by treating 6-demethyltetracycline or a 7-halo-6-demethyltetracycline with an oxidizing agent. Suitable oxidizing agents are, for example, oxygen, electrophilic halogen (such as an alkali metal chlorate and hydrochloric acid), mercuric acetate or equivalent mercury salts, cupric acetate or equivalent copper salts, alkali metal periodates, potassium permanganate, alkali metal peroxides and ferric salts. The oxidation is conveniently carried out in a suitable solvent such as, for example, glacial acetic acid, methanol, dimethylformamide, methyl Cellosolve, and the like, at temperatures ranging from −10° C. to 35° C. over a period of time of from as little as five minutes to eight hours or more. The production of the 4-dimethylaminotetracycloxides is favored under anhydrous conditions but the presence of significant amounts of water does not exclude the possibility of isolating some of the 4-dimethylaminotetracycloxides. When the oxidation is run under aqueous conditions, then the 4-hydroxytetracycloxides are obtained. The oxidation of 6-demethyltetracycline with mercuric acetate is illustrative of the differing conditions which lead to 4-hydroxytetracycloxide on the one hand and 4-dimethylaminotetracycloxide on the other. When 6-demethyltetracycline is oxidized with mercuric acetate in the various solvent systems set forth in Table I below, the product obtained in each case depends upon the water content of the solvent system as is also set forth in Table I below.

TABLE I

| Run No. | Solvent System | Product Obtained |
|---|---|---|
| 1 | Anhydrous dimethylformamide. | Predominantly 4-dimethylaminotetracycloxide. |
| 2 | Dimethylformamide plus 5% water. | Predominantly 4-dimethylaminotetracycloxide. |
| 3 | Dimethylformamide plus 15% water. | A mixture of 4-dimethylaminotetracycloxide and 4-hydroxytetracycloxide. |
| 4 | Dimethylformamide plus 50% water. | Only 4-hydroxytetracycloxide. |

Although the solvent system of Run No. 3 is not strongly acidic, it is probable that the 4-dimethylaminotetracycloxide in the product mixture would eventually convert to 4-hydroxytetracycloxide. However, after twenty-four hours at room temperature there was considerable 4-dimethylaminotetracycloxide still present.

After the oxidation is complete, the product may be obtained by standard procedures. In the case of the 4-dimethylaminotetracycloxides, it is most convenient to merely dilute the reaction mixture with a non-solvent, e.g. water at a neutral pH, which results in precipitation of the product. In the case of the 4-hydroxytetracycloxides, the product may also be precipitated upon dilution of the reaction mixture with a non-solvent, e.g. water at a somewhat acidic pH. The 4-hydroxytetracycloxides may then be purified by recrystallization from a methyl Cellosolve-0.1 N hydrochloric acid mixture.

The novel compounds of the present invention are useful in the synthesis of the heretofore synthetically unobtainable 4-di(lower alkyl)amino - 6 - demethyltetracyclines. For example, the 4-dimethylaminotetracycloxides of the present invention may be hydrolyzed in acidic aqeuous media, as set forth above, to the corresponding 4-hydroxytetracycloxides. The 4-hydroxytetracycloxides of the present invention may then be treated with a mono(lower alkyl)amine under suitable reductive amination conditions whereby the corresponding 4-dedimethylamino-4 - mono(lower alkyl)amino - 6 - demethyltetracycline is obtained. This intermediate, in turn, may be treated with a lower alkanal, under suitable reductive alkylation conditions, whereby the corresponding 4-dedimethylamino-4-di(lower alkyl)amino - 6 - demethyltetracycline is obtained. This procedure may be used to prepare tetracyclines having a radioactive carbon in the 4-substituted amino group, for tracer studies.

The 4-dedimethylamino - 4 - di(lower alkyl)amino-6-demethyltetracyclines are biologically active and possess activity against both gram-positive and gram-negative microorganisms. For example, the antibacterial spectrum of 4-dedimethylamino-4-methylethylamino - 6 - demethyltetracycline was determined in a standard manner by the agar dilution streak technique. The antibacterial spectrum of a compound represents the amount required to inhibit the growth of various typical bacteria and is commonly used in testing new antibiotics. The minimal inhibitory concentrations expressed in gammas per milliliter of 4-dedimethylamino-4-methylethylamino - 6 - demethyltetracycline against various test organisms is shown in Table II below. For comparison purposes, the antibacterial spectrum of 6-demethyltetracycline hydrochloride against the same organisms is also included.

TABLE II (1) 4-dedimethylamino-4-methylethylamino-6-demethyltetracycline
(2) 6-demethyltetracycline hydrochloride

| Organism | (1) | (2) |
|---|---|---|
| Mycobacterium ranae | 1 | 2 |
| Mycobacterium smegmatis ATCC 607 | 2 | 4 |
| Staphylococcus aureus 209 P | 4 | 4 |
| Bacillus subtilis ATCC 6933 | 1 | 1 |
| Streptococcus pyogenes C 203 | 2 | 2 |
| Streptococcus γ No. 11 | 125 | 125 |
| Staphylococcus albus No. 69 | 125 | >250 |
| Streptococcus β No. 80 | 125 | 250 |
| Bacillus cereus No. 5 | 1 | 1 |
| Pseudomonas aeruginosa | 62 | 31 |
| Escherichia coli ATCC 9637 | 8 | 15 |
| Salmonella gallinarum | 8 | 15 |
| Streptococcus faecalis ATCC 8043 | 4 | 4 |
| Klebsiella pneumoniae ATCC 10031 | 4 | 4 |
| Proteus vulgaris ATCC 9484 | 8 | 15 |

It is to be understood that the novel tetracycloxides of the present invention may theoretically exist in other tautomeric forms as exemplified by the following tautomeric schemes:

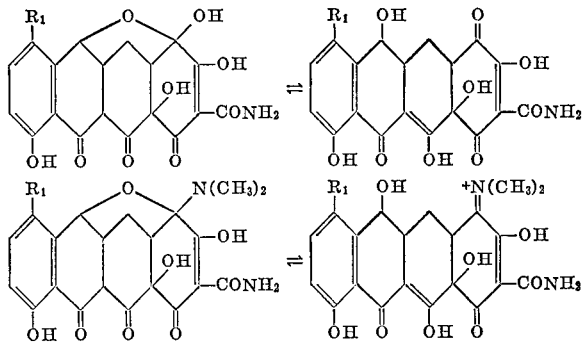

wherein $R_1$ is as previously defined. These various tautomeric forms are the equivalent of the tetracycloxide structure and are included within the purview of the present invention.

The invention will be described in greater detail in conjunction with the following specific examples.

EXAMPLE 1

4-hydroxytetracycloxide

In a solution of 800 ml. of methanol and 170 ml. of conc. hydrochloric acid was dissolved 86 g. of 6-demethyltetracycline. Then a solution of 8.6 g. of sodium chlorate in 40 ml. of water was added over a ten minute period. At the beginning of the addition, the temperature of the reaction mixture was 19.5° C., whereas at the end of the addition the temperature had risen to 25.5° C. Five minutes after the addition was complete the temperature of the reaction mixture had risen to 32° C. whereupon a heavy precipitate began forming. The reaction mixture was then stirred at room temperature for 10 minutes and then at ice bath temperature for one hour. The reaction mixture was then diluted with 200 ml. of water, the precipitate was removed by filtration and washed several times with water. The yield of vacuum-oven dried product was 50 g. The 4-hydroxytetracycloxide was recrystallized as follows: 1 g. was dissolved in 20 ml. of methyl Cellosolve and stirred with 200 mg. of Darco for 20 minutes, the Darco was removed by filtration, and the white crystalline product was precipitated by the addition of 4 volumes of 0.1 N hydrochloric acid.

EXAMPLE 2

4-hydroxytetracycloxide

In 30 ml. of glacial acetic acid was dissolved 4.3 g. of 6-demethyltetracycline and to this solution was added 1.5 g. of N-chlorosuccinimide over a period of 5 minutes. The resulting solution was stirred at room temperature for 30 minutes and then poured into 300 ml. of water. The precipitate which formed was removed by filtration and vacuum-oven dried. Recrystallization of the 4-hydroxytetracycloxide was effected in the same manner as in Example 1.

EXAMPLE 3

4-hydroxytetracycloxide

In 280 ml. of dimethylformamide was dissolved 10 g. of 6-demethyltetracycline and the resulting solution was exposed to air at room temperature for 10 days. Isolation was by evaporation of the solvent under reduced pressure followed by slurrying the dried residue in 250 ml. of 0.1 N hydrochloric acid, and collecting the insoluble material by filtration. This crude product, 4-hydroxytetracycloxide, was purified by recrystallization as in Example 1.

EXAMPLE 4

4-dedimethylamino-4-ethylamino-6-demethyltetracycline 4-hydroxytetracycloxide (3.0 g.) was dissolved in tetrahydrofuran (150 ml.) and 70% aqueous ethylamine (6.0 ml.) was added. The solution was combined with 750 mg. of 10% palladium on charcoal catalyst and immediately placed in a 500 ml. bottle and hydrogenated at 50 lbs. The reductive amination was essentially complete within 20 minutes. The catalyst was removed by filtration and the filtrate taken to dryness under reduced pressure. The crude product was collected with ether and dried. It was then suspended in methanol (40 ml.) and conc. HCl was added to give a solution with an apparent pH of one. The acidified solution was stirred for 30 minutes, during which time a crystalline by-product formed. The by-product was removed by filtration. Triethylamine was added to the filtrate to give a solution having an apparent pH of 7.0. Two glass beads were added and the solution was shaken for two hours. The crystalline 4-dedimethylamino-4-ethylamino-6 - demethyltetracycline which formed was filtered off and washed successively with chloroform and ether. Yield: 1.15 g.

EXAMPLE 5

*4-dedimethylamino-4-methylethylamino-6 demethyltetracycline*

4-dedimethylamino-4-ethylamino - 6 - demethyltetracycline (2.0 g.) was combined, in methanol (100 ml.), with 37% aqueous formaldehyde (3.2 ml.) and the apparent pH adjusted to between 3.5 and 4.5 with conc. HCl. About 0.4 ml. of conc. HCl was required. The solution was combined with 600 mg. of 10% palladium on carbon catalyst and the mixture was hydrogenated at 50 lbs. pressure for 24 hours. The catalyst was removed by filtration and the filtrate taken to dryness under reduced pressure. The product was collected with the aid of ether and dried. Paper chromatographic analysis revealed the crude product consisted largely of 4-dedimethylamino-4-epi-methylethylamino - 6 - demethyltetracycline along with a lesser amount of the "natural" 4-epimer.

The procedure for the conversion of this material to the "natural" 4-epimer was as follows: The methylethylamino derivative (1.0 g.) was dissolved in propylene glycol (45 ml.). Then, $CaCl_2 \cdot 2H_2O$ (920 mg.) dissolved in water (1 ml.) was added to the propylene glycol solution and the apparent pH of this mixture raised to 8.9 by the addition of ethanolamine. The solution was stored under a nitrogen atmosphere at 56° C. At the end of one week, paper chromatographic analysis showed the conversion to the "natural" 4-epimer was essentially complete. The solution was added dropwise to water (220 ml.) and the product, which precipitated as a calcium salt, was collected and dried. The calcium salt (500 mg.) was suspended in water (10 ml.) and then dissolved by lowering the pH to below 2.0 with dil. HCl. Raising the pH back to 2.0 with dilute sodium hydroxide resulted in the precipitation of crystalline 4-didemethylamino-4-methylethylamino-6-demethyltetracycline having the "natural" configuration at C–4. The product was collected by filtration, washed with water and dried. The material assayed at 73% of tetracycline HCl in the standard turbidimetric assay (*Staph. aureus*).

EXAMPLE 6

*7-chloro-4-hydroxytetracycloxide*

6-demethyl-7-chlorotetracycline (46.5 g.) was dissolved in glacial acetic acid (300 ml.). Concentrated HCl (85 ml.) was added to this solution and the resulting solution was then cooled to just above freezing with an ice bath. To the cooled, stirred solution there was added dropwise, over a ten minute period, a solution of sodium chlorate (4.3 g.) in 20 ml. water. At the end of the addition period, the ice bath was removed and the reaction mixture was stirred an additional ten minutes and then poured into 3 liters of water. The precipitated reaction mixture was stirred at room temperature for two hours, then placed in a chill room (4° C.) overnight. The product was collected and dried. Yield: 33.3 g. An analytically pure sample was obtained as follows: The crude material (44 g.) was dissolved in 250 ml. of dimethylformamide and treated with Darco G–60 (10 g.). The solution was filtered and diluted with 1 liter of water giving a gummy precipitate. The gum was collected and retreated with Darco G–60 in dimethylformamide. Slow addition of two volumes of water gave a crystalline product. Repeating this procedure on the isolated crystals gave a sample (23 g.) which analyzed correctly for the product with one mole of crystallization of dimethylformamide.

EXAMPLE 7

*4-dedimethylamino-4-methylamino-6-demethyl-7-chlorotetracycline*

Methylamine hydrochloride (844 mg.) was dissolved in methyl Cellosolve (20 ml.) and 10 N NaOH was added to an apparent pH of 10.6. The salt which formed was removed by filtration. To the amine-containing solution was added 7-chloro-4-hydroxytetracycloxide followed immediately by addition, over a two minute period, of sodium borohydride (93 mg.). The solution was stirred thirty minutes, then taken to dryness under reduced pressure. The crude solid was taken up in water (100 ml.) and the pH adjusted to 0.8 with HCl. The insoluble materials were removed by filtration and the filtrate was extracted with butanol. Removal of the butanol under reduced pressure gave crude 4-dedimethylamino-4-methylamino-6-demethyl-7-chlorotetracycline. Purification of this material could be accomplished by crystallization procedures or by chromatographic means.

EXAMPLE 8

*4-dimethylaminotetracycloxide*

6-demethyltetracycline (50 g.) was dissolved in dimethylformamide (400 ml.). To this solution was added mercuric acetate (36.9 g.). The mixture was stirred overnight at room temperature and then filtered. The filtrate was cooled to ice-bath temperature and then combined with three volumes of cold water. The precipitate was collected by filtration, washed well with cold water and dried. Yield: 42.8 g.

Similar results were obtained through the use of corresponding amounts of either cupric acetate or potassium periodate in place of mercuric acetate. In addition, simply bubbling oxygen (air) through a dimethylformamide solution of 6-demethyltetracycline gives the product. In the latter case a longer reaction time is required.

EXAMPLE 9

*7-chloro-4-dimethylaminotetracycloxide*

By replacing the 6-demethyltetracycline employed in Example 8 by an equimolecular quantity of 7-chloro-6-demethyltetracycline and following substantially the same procedure described in Example 8, there is obtained the 7-chloro-4-dimethylaminotetracycloxide.

What is claimed is:

1. A compound of the formula:

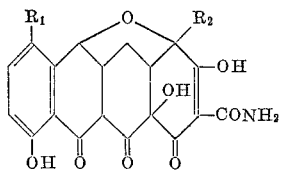

wherein $R_1$ is selected from the group consisting of hydrogen and halogen and $R_2$ is selected from the group consisting of hydroxy and dimethylamino.

2. 4-hydroxytetracycloxide.
3. 7-chloro-4-hydroxytetracycloxide.
4. 7-bromo-4-hydroxytetracycloxide.
5. 7-iodo-4-hydroxytetracycloxide.
6. 4-dimethylamino tetracycloxide.
7. 7-chloro-4-dimethylaminotetracycloxide.
8. 7-bromo-4-dimethylaminotetracycloxide.
9. 7-iodo-4-dimethylaminotetracycloxide.
10. The method of preparing a compound of the formula:

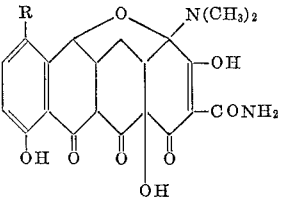

wherein R is selected from the group consisting of hydrogen and halogen, which comprises treating a solution of a compound of the formula:

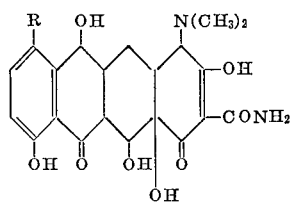

wherein R is as hereinabove defined in an anhydrous solvent system, with an oxidizing agent at a temperature of from about −10° C. to about 35° C.

11. The method of preparing a compound of the formula:

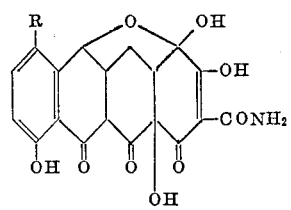

wherein R is selected from the group consisting of hydrogen and halogen, which comprises treating a solution of a compound of the formula:

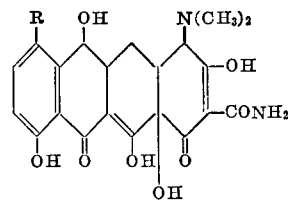

wherein R is as hereinabove defined in an aqueous solvent system, with an oxidizing agent at a temperature of from about −10° C. to about 35° C.

No references cited.

NICHOLAS S. RIZZO, *Primary Examiner.*

JAMES W. ADAMS, JR., *Assistant Examiner.*